United States Patent
Shanmugam et al.

(10) Patent No.: US 12,437,233 B2
(45) Date of Patent: Oct. 7, 2025

(54) AUTONOMOUS ALLOCATION OF DEEP NEURAL NETWORK INFERENCE REQUESTS IN A CLUSTER WITH HETEROGENEOUS DEVICES

(71) Applicant: Intel Corporation, Santa Clara, CA (US)

(72) Inventors: Suryaprakash Shanmugam, Santa Clara, CA (US); Yamini Nimmagadda, Portland, OR (US); Akhila Vidiyala, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1031 days.

(21) Appl. No.: 17/470,654

(22) Filed: Sep. 9, 2021

(65) Prior Publication Data
US 2021/0406777 A1    Dec. 30, 2021

(51) Int. Cl.
*G06N 20/00* (2019.01)
*G06F 9/48* (2006.01)
*G06F 9/50* (2006.01)

(52) U.S. Cl.
CPC .......... *G06N 20/00* (2019.01); *G06F 9/4881* (2013.01); *G06F 9/5044* (2013.01); *G06F 2209/485* (2013.01); *G06F 2209/501* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 2009/0083705 A1* | 3/2009 | Phillips | G06F 8/71 717/113 |
| 2017/0011606 A1* | 1/2017 | Ceccon | G07G 1/0054 |
| 2018/0115522 A1* | 4/2018 | Gleichauf | H04W 84/18 |
| 2021/0021431 A1* | 1/2021 | Guim Bernat | H04L 9/3239 |
| 2021/0144517 A1* | 5/2021 | Guim Bernat | H04L 9/3247 |

OTHER PUBLICATIONS

Kulkarni et al., "Dynamic Adaptation for Elastic System Services Using Virtual Servers", Dec. 1, 2015, IEEE, 2015 IEEE 22nd International Conference on High Performance Computing (HiPC) (2015, pp. 125-134) (Year: 2015).*

* cited by examiner

*Primary Examiner* — Davoud A Zand
(74) *Attorney, Agent, or Firm* — Nicholson De Vos Webster & Elliott LLP

(57) ABSTRACT

Systems, apparatuses and methods include technology that identifies compute capacities of edge nodes and memory capacities of the edge nodes. The technology further identifies a first variant of an Artificial Intelligence (AI) model, and assigns the first variant to a first edge node of the edge nodes based on a compute capacity requirement associated with execution of the first variant, a memory resource requirement associated with execution of the first variant, the compute capacities and the memory capacities.

25 Claims, 8 Drawing Sheets

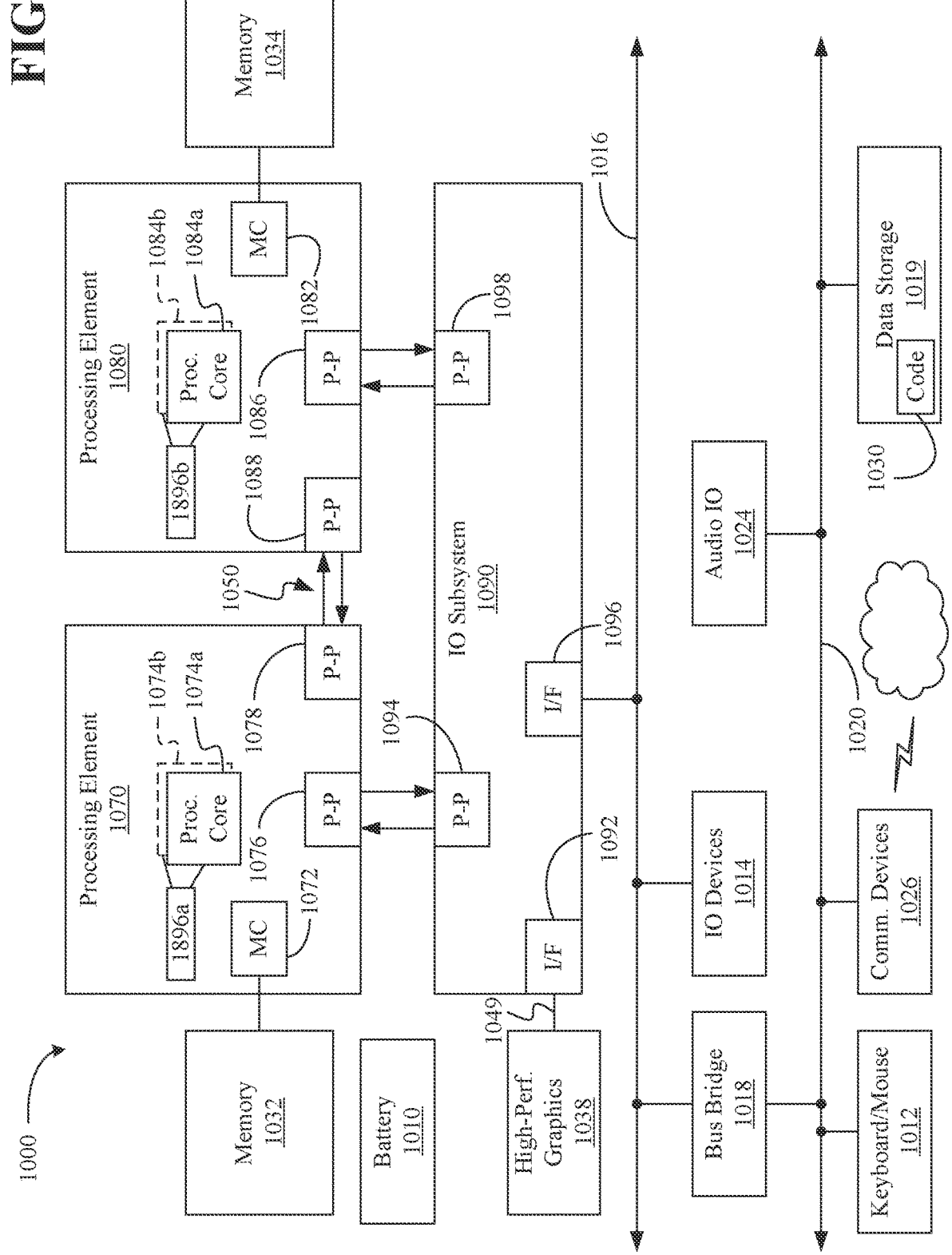

US 12,437,233 B2

AUTONOMOUS ALLOCATION OF DEEP NEURAL NETWORK INFERENCE REQUESTS IN A CLUSTER WITH HETEROGENEOUS DEVICES

CROSS-REFERENCE TO RELATED APPLICATION

The present application claims the benefit of priority to Indian Patent Application No. 202141026230, filed on Jun. 12, 2021.

TECHNICAL FIELD

Embodiments generally relate to processing architectures that execute artificial intelligence (AI) processing. More particularly, embodiments relate to automatically allocating inference requests on available edge nodes in an edge cluster based on compute and memory characteristics of the edge nodes and compute and memory conditions of the inference requests.

BACKGROUND

A wide-spread adoption of edge computing devices for AI applications is on the rise. Therefore, a cluster of heterogeneous edge devices may need to process incoming inference service requests in an efficient manner. Although cloud service providers provide a centralized inference serving system, the manner in which the inference requests originating from some devices (e.g., internet-of-things (IoT) devices) are handled may be an open issue and difficult to reconcile for users. This stands as a barrier for the users to achieve full and efficient use of edge node compute resources.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an example of a multi-processor based computing system according to an embodiment.

DESCRIPTION OF EMBODIMENTS

Some embodiments may analyze an AI model's (e.g., deep learning (DL) model) characteristics to efficiently allocate an AI model on edge devices of a heterogeneous edge cluster (e.g., heterogeneous accelerators) in a latency and cost aware manner. Some embodiments may execute with enhanced performance, efficient resource utilization and low latency execution for AI workloads in the edge cluster.

In a serverless architecture pertaining to the execution of DL models where users are oblivious to the underlying compute resources, embodiments automatically allocate inference requests on available nodes in an edge cluster to achieve an efficient distribution of inference requests across nodes while also complying with latency requirements (e.g., conditions) associated with the inference requests. Thus, a user may not have awareness of the underlying hardware that will execute the inference requests, and the inference requests are automatically allocated based on a compute and memory based analysis. That is, some embodiments allocate inference requests based on compute and memory requirements of the inference requests and compute and memory capabilities of the edge nodes. In doing so, some embodiments as described herein may:

1) minimize average inference latency costs;
2) minimize average utilization cost of edge nodes (e.g., Total Cost of Optimization (TCO)); and
3) maximize resource utilization for each edge node.

Some embodiments employ an optimization variant of a bin packing problem with constraints on inference latency, and utilization cost (e.g., memory and compute). In such embodiments, edge nodes may be analogous to the bins and the AI models may be analogous to objects to pack within the bins (e.g., edge nodes). Embodiments may seek to minimize the costs mentioned above under the compute and memory capacity constraints of edge nodes.

Conventional implementations may not effectively characterize AI workloads during partitioning, device selection, and deployment. Other conventional implementations may deploy based on static characterization by the user and does not include any autonomous allocation of AI workloads. Conventional implementations may also fail to provide sufficient information on the best hardware suited for the given workloads. Users must specify the hardware, and the workload is automatically scaled on the specified hardware, if at all. Thus, conventional implementations fail to provide any autonomous allocation of AI workloads. Embodiments as described herein are thus enhanced at least to the extent that workloads are automatically distributed based on identified memory and compute characteristics of the AI workload and edge devices.

Figure 1:
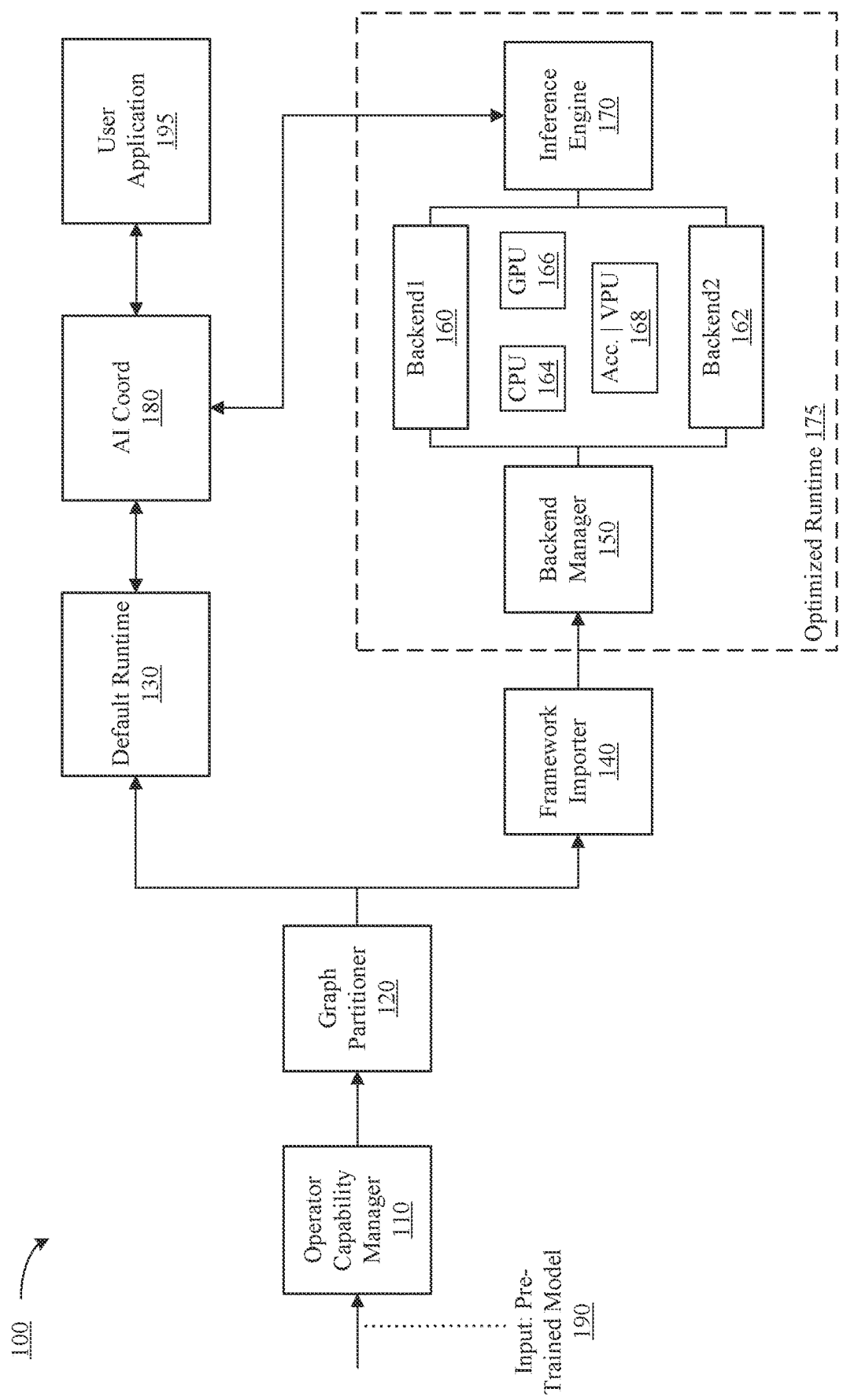
FIG. 1 is a block diagram of an example of a block an AI framework integration system according to an embodiment.

Turning now to FIG. 1 provides a block diagram illustrating an example of an AI framework integration system 100 according to one or more embodiments, with reference to components and features described herein including but not limited to the figures and associated description. As shown in FIG. 1, the system 100 includes an operator capability manager 110, a graph partitioner 120, a default runtime 130, a framework importer 140, a backend manager 150, a first backend (backend1) 160, a second backend (backend2) 162, hardware execution units including a CPU 164, a GPU 166, and a hardware accelerator such as a VPU (or another type of hardware AI accelerator), an inference engine 170 and an AI coordinator 180. It is understood that a variety of hardware execution units including a plurality of CPUs 164, GPUs 166 and/or VPUs 168 can be employed in the system 100. It is further understood that a variety of backends can be included in the system 100. Together, the backend manager 150, the first backend (backend1) 160, the second backend (backend2) 162, the hardware execution units (including one or more CPUs 164, one or more GPUs 166, and one or more VPUs 168) and the inference engine 170 form an optimized runtime 175.

The system 100 receives as input a pre-trained model 190. The pre-trained model 190 may be developed using an AI framework from a variety of sources, including, for example, TensorFlow, ONNX Runtime, PyTorch, etc. The pre-trained model 190 typically includes information and data regarding the model architecture (i.e., graph), including nodes, operators, weights and biases. Each node in a model graph represents an operation (e.g. mathematical, logical operator etc.) which is evaluated at runtime.

The operator capability manager 110 receives the input pre-trained model 190 and analyzes the operators in the model to determine which operators or nodes are supported, and under what conditions, by the available backend technology and hardware units. The analysis includes evaluating the operators, attributes, data types (e.g., precision data types), and input nodes. The operator capability manager 110 marks the operators or nodes as supported or unsupported.

The graph partitioner 120 takes the pretrained model architecture, as marked by the operator capability manager 110, and partitions (e.g., divides) the model into subgraphs (i.e., groups of operators, or clusters). The subgraphs are allocated into two groups—supported subgraphs and unsupported subgraphs. Supported subgraphs are those subgraphs having operators or nodes that are supported by the available backend technology and hardware units under the conditions present in the model. Unsupported subgraphs are those subgraphs having operators or nodes that are not supported by the available backend technology and hardware units under the conditions present in the model. Supported subgraphs are designated for further processing to be run via the optimized runtime 175. Unsupported subgraphs are designated to be run via the default runtime 130. In some circumstances, the system can be "tuned" to enhance speed and efficiency in execution speed and/or memory usage by re-designating certain supported subgraphs to be executed via the default runtime.

The default runtime 130 is the basic runtime package provided for the AI framework corresponding to the input pre-trained model 190. The default runtime 130 executes on basic CPU hardware with no hardware accelerator support. The default runtime 130 typically includes a compiler to compile the unsupported subgraphs into executable code to be run on the basic CPU hardware.

The framework importer 140 receives supported subgraphs from the graph partitioner 120. The subgraphs are typically in a format specific to the framework used to generate the model. The framework importer 140 takes the subgraphs and generates an intermediate representation for these subgraphs, to be interpreted (i.e., read/parsed) by the optimized runtime 175. The intermediate representation produces a structured data set comprising the model architecture, metadata, weights and biases.

The backend manager 150 receives the intermediate representation of the supported model subgraphs and applies optimization techniques to optimize execution of the model using available backends and hardware options. For example, the backend manager 150 can select among available backends, e.g., the backend1 160 or the backend2 162. In some embodiments, the backend1 160 represents a basic backend that is optimized for a particular group of hardware units. For example, where the optimized runtime 175 utilizes the Open Visual Inference and Neural network Optimization (OpenVINO) runtime technology, the backend1 160 can be the OpenVINO backend. In some embodiments, the backend2 162 can be a backend such as VAD-M, which is optimized for machine vision tasks using a VPU such as the Intel® Myriad X VPU. The selected backend compiles (via a compiler) supported subgraphs into executable code, and performs optimization. The backend manager also selects among the available hardware units—the CPU 164, GPU 166 and/or VPU (or AI accelerator) 168. The backend manager 150 also dispatches data to the selected backend and schedules execution (inference) of the optimized model via the inference engine 170.

The inference engine 170 controls execution of the model code on the various hardware units that are employed for the particular model optimization. The inference engine 170 reads the input data and compiled graphs, instantiates inference on the selected hardware, and returns the output of the inference.

The AI coordinator 180 coordinates execution of AI workflow requests from a user application 195. The AI workflow requests are handled between the default runtime 130 (executing code generated from unsupported subgraphs) and the optimized runtime 175 (e.g., executing code generated from supported subgraphs). In one or more embodiments, the AI coordinator 180 is integrated within the default runtime 130. In one or more embodiments, the AI coordinator 180 is integrated within the optimized runtime 175.

Some or all components in the system 100 may be implemented using one or more of a CPU, a GPU, an AI accelerator, a FPGA accelerator, an ASIC, and/or via a processor with software, or in a combination of a processor with software and an FPGA or ASIC. More particularly, components of the system 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

For example, computer program code to carry out operations by the system 100 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 2:
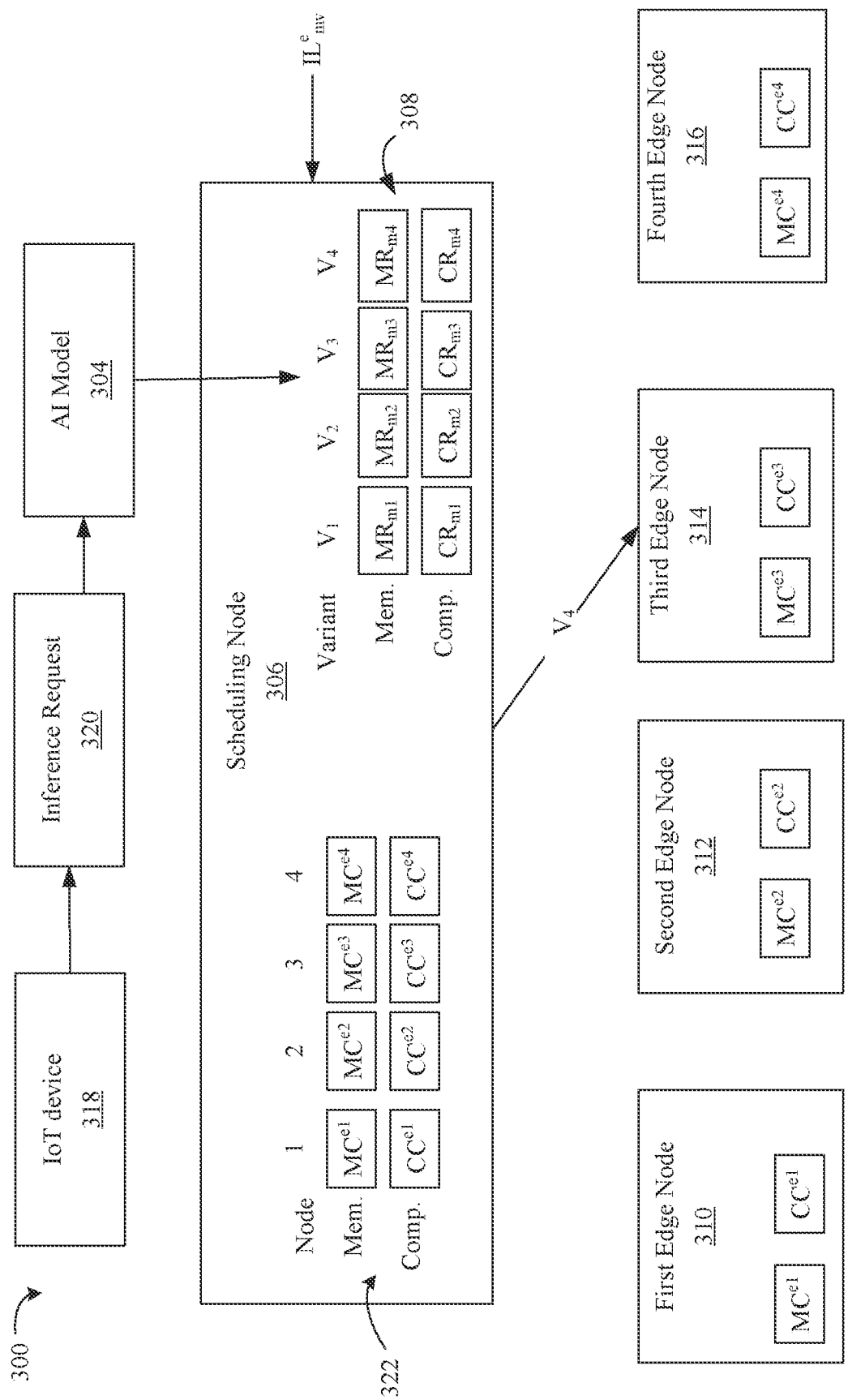
FIG. 2 is a diagram of an example of a process to select and allocate an inference request to an edge node according to an embodiment.

FIG. 2 shows a process 300 to autonomously allocate an inference request 320 originating from an IoT device 318. In detail, the inference request 320 may trigger an AI model 304 to be executed. For example, the AI model 304 (which is pre-trained) may be triggered to execute the inference request 320 and generate an inference on data. The AI model 304 may be a graph model of a neural network. The AI model 304 may be a graph model (e.g., deep learning model, a multi-layer graph that includes operators/nodes, weights and biases, etc.) that corresponds to the inference request 320 and may be a graph representation of a neural network.

A scheduling node 306 receives the AI model 304 and identifies variants $V_1$-$V_4$ of the AI model 304. The variants $V_1$-$V_4$ may be different representations of the AI model 304 that are optimized (e.g., node fusion operations, unrolling of loops, etc.) that are enhanced in different manners and differ from each other. The variants $V_1$-$V_4$ may operate differently from each other but produce a same output based on a same input. The scheduling node 306 includes a variant data structure 308 that stores characteristics and conditions associated with execution of the variants $V_1$-$V_4$. Variants $V_1$-$V_4$ have different compute capacity requirements $CR_{m1}$-$CR_{m4}$ and memory capacity requirements $MR_{m1}$-$MR_{m4}$. The compute capacity requirements $CR_{m1}$-$CR_{m4}$ may be determined based on FLOPs, batch size, input shape (e.g., size, a length (number of elements) of each of axes of a tensor or input data) of nodes (or layers) of the respective variants $V_1$-$V_4$, and precision associated with the first-fourth variants $V_1$-$V_4$. The compute capacity requirements $CR_{m1}$-$CR_{m4}$ and memory capacity requirements $MR_{m1}$-$MR_{m4}$ may be requirements or conditions that should be met for the variants $V_1$-$V_4$ to execute with efficiency. In this example, variant $V_1$ has a compute capacity requirement $CR_{m1}$ and a memory capacity requirement $MR_{m1}$. Variant $V_2$ has a compute capacity requirement $CR_{m2}$ and a memory capacity requirement $MR_{m2}$. Variant $V_3$ has a compute capacity requirement $CR_{m3}$ and a memory capacity requirement $MR_{m3}$. Variant $V_4$ has a compute capacity requirement $CR_{m4}$ and a memory capacity requirement $MR_{m4}$.

The scheduling node 306 further includes an edge node data structure 322 that stores memory and compute characteristics (e.g., available resources) related to first-fourth edge nodes 310, 312, 314, 316. The first-fourth edge nodes 310, 312, 314, 316 may be a heterogeneous edge array. The first edge node 310 has a memory capacity $MC^{e1}$ and computational capacity of $CC^{e1}$. The second edge node 312 has a memory capacity $MC^{e2}$ and computational capacity of $CC^{e2}$. The third edge node 314 has a memory capacity $MC^{e3}$ and computational capacity of $CC^{e3}$. The fourth edge node 316 has a memory capacity $MC^{e4}$ and computational capacity of $CC^{e4}$. Compute capacity, including compute capacities $CC^{e1}$, $CC^{e2}$, $CC^{e3}$, and $CC^{e4}$ may be expressed in metrics such as gigaFLOPS (GLOPS), number of parallel execution units, types of execution units etc. of the respective edge node of the first-fourth edge nodes 310, 312, 314, 316. The compute capacities $CC^{e1}$, $CC^{e2}$, $CC^{e3}$, $CU^{e4}$ and memory capacities $MC^{e1}$, $MC^{e2}$, $MC^{e3}$, $MC^{e4}$ may be maximum resources available on the respective first-fourth edge nodes 310, 312, 314, 316 for execution of a variant $V_1$-$V_4$.

In some examples, the compute capacities $CC^{e1}$, $CC^{e2}$, $CC^{e3}$, $CC^{e4}$ may be scaled based on the inference request 320. For example, if the inference request 320 is a vision processing request, and the first edge node 310 is a vision processing unit (VPU), the compute capacity $CC^{e1}$ may be increased by a scaling factor based on the VPU being specialized (and hence more efficient) at processing the inference request 320. In contrast, if the inference request 320 were different (e.g., determine health problems based on symptoms of a user), the compute capacity $CC^{e1}$ may not be increased by the scaling factor since the VPU does not specialize in processing the inference request 320. Thus, the compute capacities $CC^{e1}$, $CC^{e2}$, $CC^{e3}$, $CC^{e4}$ may be scaled by a factor based on whether the first-fourth edge nodes 310, 312, 314, 316 are accelerators that specialize in processing the inference request 320.

In some embodiments, the process 300 assumes that each of the first-fourth edge nodes 310, 312, 314, 316 may fully attend to one inference request at any point of time without any co-location of different models or their variants. That is, some embodiments assume that any given node from the first-fourth edge nodes 310, 312, 314, 316 may process the incoming request irrespective of the underlying hardware architecture of the computing unit (i.e. central processing unit (CPU), graphics processing unit (GPU), or deep learning (DL) accelerators).

The scheduling node 306 may further receive a throughput or latency requirement $Il^e_{mv}$. The latency requirement $Il^e_{mv}$ may be a requirement that the inference request 320 be executed within a certain period of time or prior to a specified time. The latency requirement $Il^e_{mv}$ may be specified by the IoT device 318 or set ahead of time by a user.

A model variant from the variants $V_1$-$V_4$ may be selected based on the variant and edge node data structures 322, 308 and the latency requirement $Il^e_{mv}$. For example, any chosen model variant from the variants $V_1$-$V_4$ may be assigned to a respective edge node of the first-fourth edge nodes 310, 312, 314, 316 when the following requirements are met: 1) compute capacity requirement of the chosen model variant is less than the compute capacity the respective edge node, 2) memory capacity requirement of the chosen model variant is less than the memory capacity of the respective edge node, and 3) the latency requirement $Il^e_{mv}$ would be met. Model variants from the variants $V_1$-$V_4$ that are unable to satisfy the latency requirement $Il^e_{mv}$ may be eliminated. For example, some embodiments may estimate the execution time of a respective variant from the variants $V_1$-$V_4$ based on operations of the variant, a size of the variant, weights of the variant, historical data associated with execution of the respective variant. The estimated execution time of the respective variant may be compared to the latency requirement $Il^e_{mv}$ to determine if the respective variant satisfies the latency requirement $Il^e_{mv}$ and eliminate the respective variant if the respective variant does not satisfy the latency requirement $Il^e_{mv}$.

In this example, the process 300 selects the fourth variant $V_4$ to execute on the third edge node 314. That is, the scheduling node 306 may determine that the fourth variant $V_4$ has a memory capacity requirement $MR_{m4}$ less than the memory capacity $MC^{e3}$ of the third edge node 314, that the compute capacity requirement $CR_{m4}$ of the fourth variant $V_4$ is less than the compute capacity $CC^{e3}$ of the third edge node 314 and that the fourth variant $V_4$ satisfies the latency requirement $Il^e_{mv}$.

In contrast, the scheduling node 306 may determine that the first variant $V_1$, second variants $V_2$ and third variant $V_3$ fail to satisfy the above requirements and are thus bypassed for execution. For example, the memory capacity requirement $MR_{m1}$ of the first variant $V_1$ may be greater the memory capacities $MC^{e1}$, $MC^{e2}$, $MC^{e3}$, $MC^{e4}$ and is thus bypassed for execution. The compute capacity requirement $CR_{m2}$ of the second variant $V_2$ may be greater than the compute capacities $CC^{e1}$, $CC^{e2}$, $CC^{e3}$, $CC^{e4}$ and is thus bypassed for execution. The third variant $V_3$ may fail to satisfy the latency requirement $Il^e_{mv}$, and is thus bypassed for execution.

The above process 300 may therefore allocate the fourth variant $V_4$ based on characteristics of the fourth variant $V_4$ and of the first-fourth edge nodes 310, 312, 314, 316. The process 300 may execute over every inference request that is received. Doing so leads to satisfaction of an enhancement objective which is expressed as the following:

$$O: \min \alpha L + (1-\alpha)C \quad \text{Equation 1}$$

In Equation 1, L and C represent the average latency and utilization costs of all edge nodes respectively, including first, second, third and fourth edge nodes 310, 312, 314, 316, and α denotes the weight placed on average latency. Minimization of O is constrained by the compute and memory capacity $CC^{e1}$, $CC^{e2}$, $CC^{e3}$, $CC^{e4}$, $MC^{e1}$, $MC^{e2}$, $MC^{e3}$, $MC^{e4}$ of the first, second, third and fourth edge nodes 310, 312, 314, 316. Since the fourth model variant $V_4$ is chosen based on its capacity requirements $CR_{m4}$ and $MR_{m4}$ under the above constraints this is an example of the two-dimensional bin packing problem.

In some embodiments, inference latency on a given computing unit is determined by a model's, such as AI model 304, compute characteristics such as required FLOPs, batch size, input shape, and precision. As one example, suppose that $\mathcal{M} = \{1, \ldots, M\}$ that is a set of supported models on the first, second, third, fourth edge nodes 310, 312, 314, 316. For each model $m \in \mathcal{M}$ there exists $\mathcal{V}_m = \{1, \ldots, V_m\}$ such that $V_m$ denotes the possible model variants of the model m. According to the throughput or latency requirement $IL^e_{mv}$ specified by an IoT client i, which may be the IoT device 318, a model variant is chosen for allocation. Any chosen model variant has a compute capacity requirement $CR_{mv}$ that is less than a compute capacity (may be referred to as $CC^e$) of a respective edge node (that will execute the variant) from the first, second, third, fourth edge nodes 310, 312, 314, 316 and a memory capacity requirement $MR_{mv}$ that is less than a memory capacity (which may be referred to as $MC^e$) of the respective edge node.

Some embodiments provide a heuristic for solving a deep neural network (DNN) workload allocation problem. In some embodiments, scheduling node 306 executes Pseudocode 1 below to iterate through all model types of all received inference requests, and attempts to allocate a node to one of the variants of each of the models according to an allocation algorithm that is described in Pseudocode 2. Execution of Pseudocode 1 then computes and returns the utilization and latency costs of the allocations (which may be referred to as allocation X) for all allocations of the inference requests. "X" may store all allocations (models and nodes) and cost(X), and latency(X) may be an aggregate latency and cost for all allocations of the inference requests. The values for C and L may be used to calculate a final value for the enhancement objective to measure a total score for the allocations. Execution of Pseudocodes 1 and 2 may implicitly fulfill minimization of the enhancement objective. For example, the scheduling node 306 executes Pseudocode 2 to assign a model variant to an edge node by iterating over all edge nodes, such as first-fourth edge nodes 310, 312, 314, 316, and model variants, such as model variants $V_0$-$V_4$, and finds the best fit of a respective model according to the capacity constraints and returns the allocation x.

Pseudocode 1 and Pseudocode 2 are provided below:

| Pseudocode 1 |
| --- |
| Heuristic for DNN Model Allocation |
| 1: for m in $\mathcal{N}_I$ do |
| 2:    x ← ALLOCATE(m, $\mathcal{N}_E$) //Pseudocode 2 |
| 3: done |
| 4: C ← Cost(x) |
| 5: L ← Latency(x) |
| 6: return C, L |

| Pseudocode 2 |
| --- |
| ALLOCATE |
| 1: def ALLOCATE(m, $\mathcal{N}_E$) |
| 2:    for e in $\mathcal{N}_e$ do |
| 3:      for v in $\mathcal{V}_m$ do |
| 4:        if $MR_{mv} < MC^e$ AND $CR_{mv} < CC^e$ then |
| 5:          x = allocation of mv for request m into e |
| 6:          return x |
| 7:      done |
| 8:    done |
| 9: return NULL |
| 10. done |

Pseudocode 2 may exit and return an allocation when a variant v (which will be referred to as first variant v below) of a model and edge node e meet the criteria (i.e., $MR_{mv} < MC^e$ AND $CR_{mv} < CC^e$). The allocation maps the first variant v to the edge node e. Thus, hypothetically, although a second variant v of the same model may also fulfill the criteria, the second variant v may not be allocated since Pseudocode 2 is exited in response to the first variant being allocated. That is, Pseudocode 2 may not even analyze whether the second variant v fulfills the criteria since the Pseudocode 2 exits when the first variant is allocated. Exiting Pseudocode 2 when the allocation of the first variant v to the edge node e may reduce computing resources and latency for the allocation process since it may be irrelevant whether more than one variant is able to be allocated. Rather, only one variant may meet the above criteria to be allocated and enhance performance and resource utilization. The aforementioned process 300 may thus allocate model variants $V_1$-$V_4$ to first-fourth edge nodes 310, 312, 314, 316 in a latency and cost aware manner based on memory and compute characteristics. Thus, embodiments autonomously operate to increase efficient utilization of the first-fourth edge nodes 310, 312, 314, 316.

Figure 3:
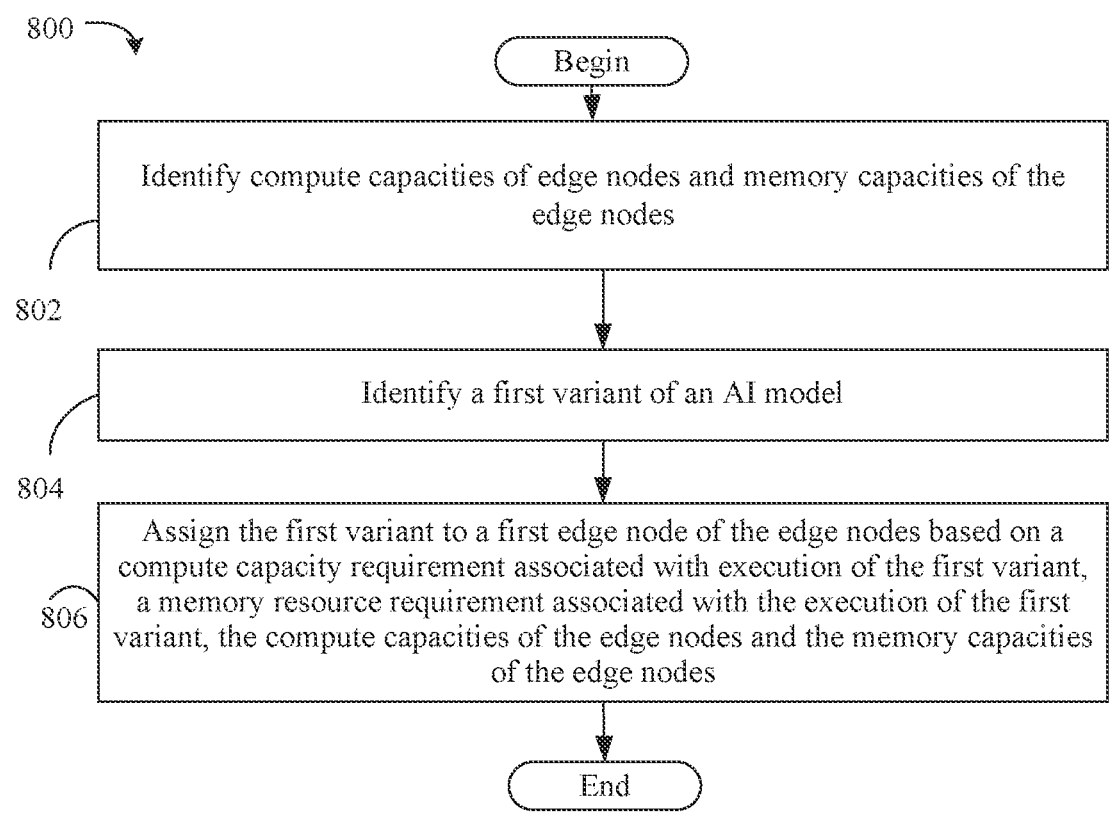
FIG. 3 is a flowchart of an example of a method of autonomous allocation of inference requests according to an embodiment.

FIG. 3 shows a method 800 of autonomous allocation of inference requests. The method 800 may generally be implemented with the embodiments described herein, for example, the system 100 (FIG. 1) and/or the process 300 (FIG. 2), already discussed. In an embodiment, the method 800 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 800 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 802 identifies compute capacities of edge nodes and memory capacities of the edge nodes. Illustrated processing block 804 identifies a first variant of an AI model. Illustrated processing block 806 assigns the first variant to a first edge node of the edge nodes based on a compute capacity requirement associated with execution of the first variant, a memory resource requirement associated with the execution of the first variant, the compute capacities of the edge nodes and the memory capacities of the edge nodes.

In some embodiments, the method 800 further includes identifying a plurality of variants of the AI model, determining whether the plurality of variants satisfy a latency condition associated with the AI model, and bypassing a second variant of the plurality of variants for execution based on an identification that the second variant does not satisfy the latency condition. In such embodiments, the method 800 further includes identifying that a third variant of the plurality of variants satisfies the latency condition and bypassing the third variant for execution based on an identification that one or more of a memory resource requirement associated with the third variant is unsatisfied by the memory capacities or a compute capacity requirement associated with the third variant is unsatisfied by the compute capacities.

In some embodiments, the method 800 further includes determining that a first compute capacity of the compute capacities satisfies the compute capacity requirement, where the first compute capacity is associated with the first edge node, and determining that a first memory capacity of the memory capacities satisfies the memory resource requirement, where the first memory capacity is associated with the first edge node. In some embodiments, the method 800 further includes determining that one or more of the compute capacity requirement is not satisfied by a second compute capacity of the compute capacities or the memory resource requirement is not satisfied by a second memory capacity of the memory capacities, where the second memory capacity and the second compute capacity are associated with a second edge node of the edge nodes, and bypassing the second edge node for the execution of the first variant.

In some embodiments, the method 800 further includes bypassing analysis of whether a second variant of the AI model is to be executed in response to the first variant being assigned to the first edge node. In doing so, the method 800 reduces a number of calculations that are executed to reduce latency and processing power.

Figure 4:
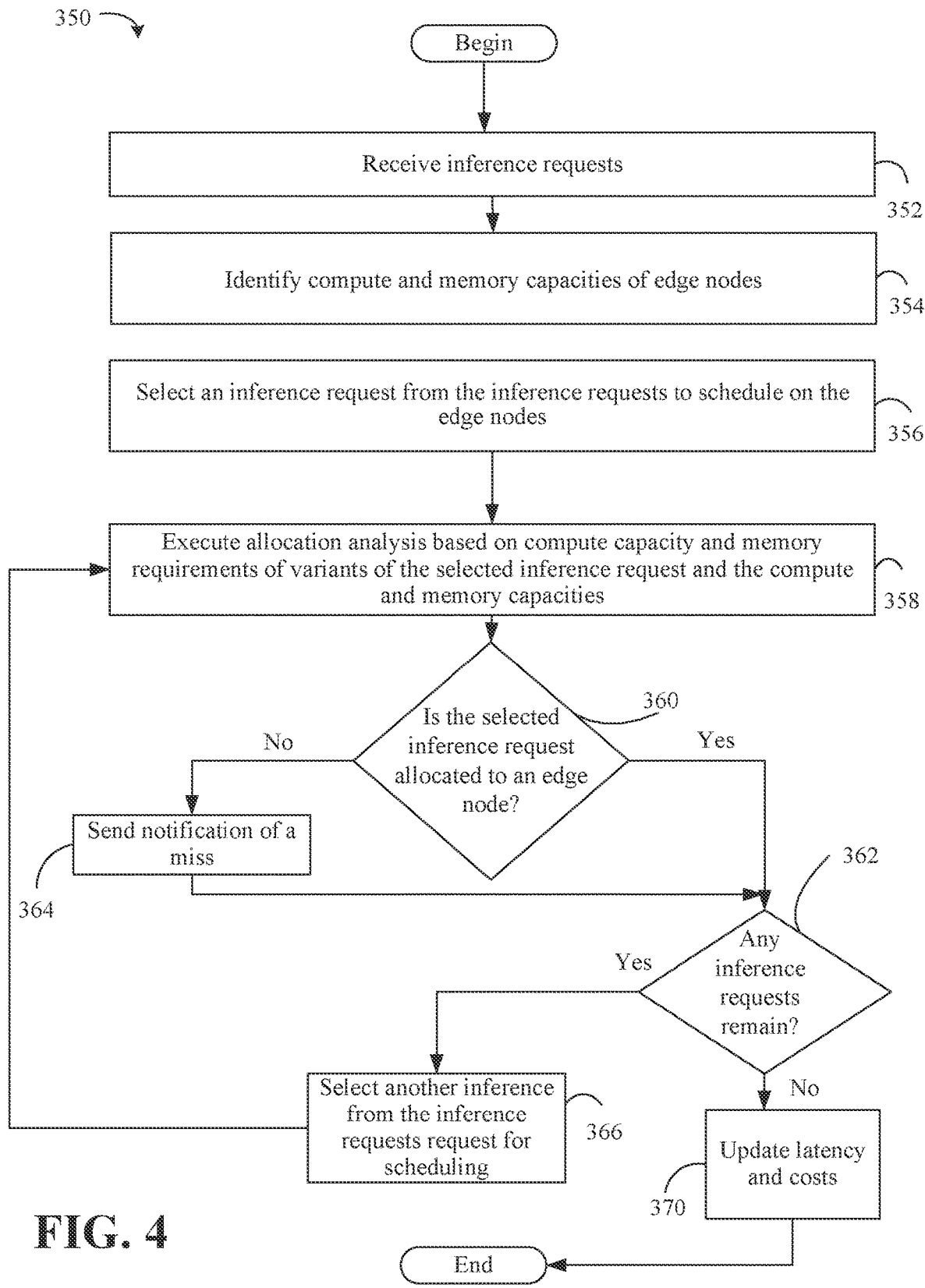
FIG. 4 is a flowchart of an example of a method of allocating a plurality of inference requests to edge nodes according to an embodiment.

FIG. 4 shows a method 350 to allocate a plurality of inference requests to edge nodes. The method 350 may generally be implemented with the embodiments described herein, for example, the system 100 (FIG. 1), the process 300 (FIG. 2) and/or method 800 (FIG. 3) already discussed. The method 350 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof Illustrated processing block 352 receives inference requests. Illustrated processing block 354 identifies compute and memory capacities of edge nodes that are to execute inference requests. Illustrated processing block 356 selects an inference request from the inference requests to schedule on the edge nodes. Illustrated processing block 358 executes allocation analysis based on compute capacity and memory requirements of variants of the selected inference request and the compute and memory capacities of the edge nodes. For example, illustrated processing block 358 may implement Pseudocode 2 to attempt to assign a variant of the inference request to an edge node of the edge nodes. For example, processing block 358 may iterate through the edge nodes one at a time to determine if the compute and memory requirements of one of the variants is less than the memory and compute capacity of the edge node, and assign the variant to the edge node if so. Illustrated processing block 360 determines if the selected inference request is assigned to an edge node. If so, illustrated processing block 362 executes. If not, illustrated processing block 364 sends a notification of a miss (e.g., a misassignment). Illustrated processing block 362 determines if any inference requests remain. If so, illustrated processing block 366 selects another inference request for scheduling. Otherwise, illustrated processing block 370 updates latency and costs.

Figure 5:
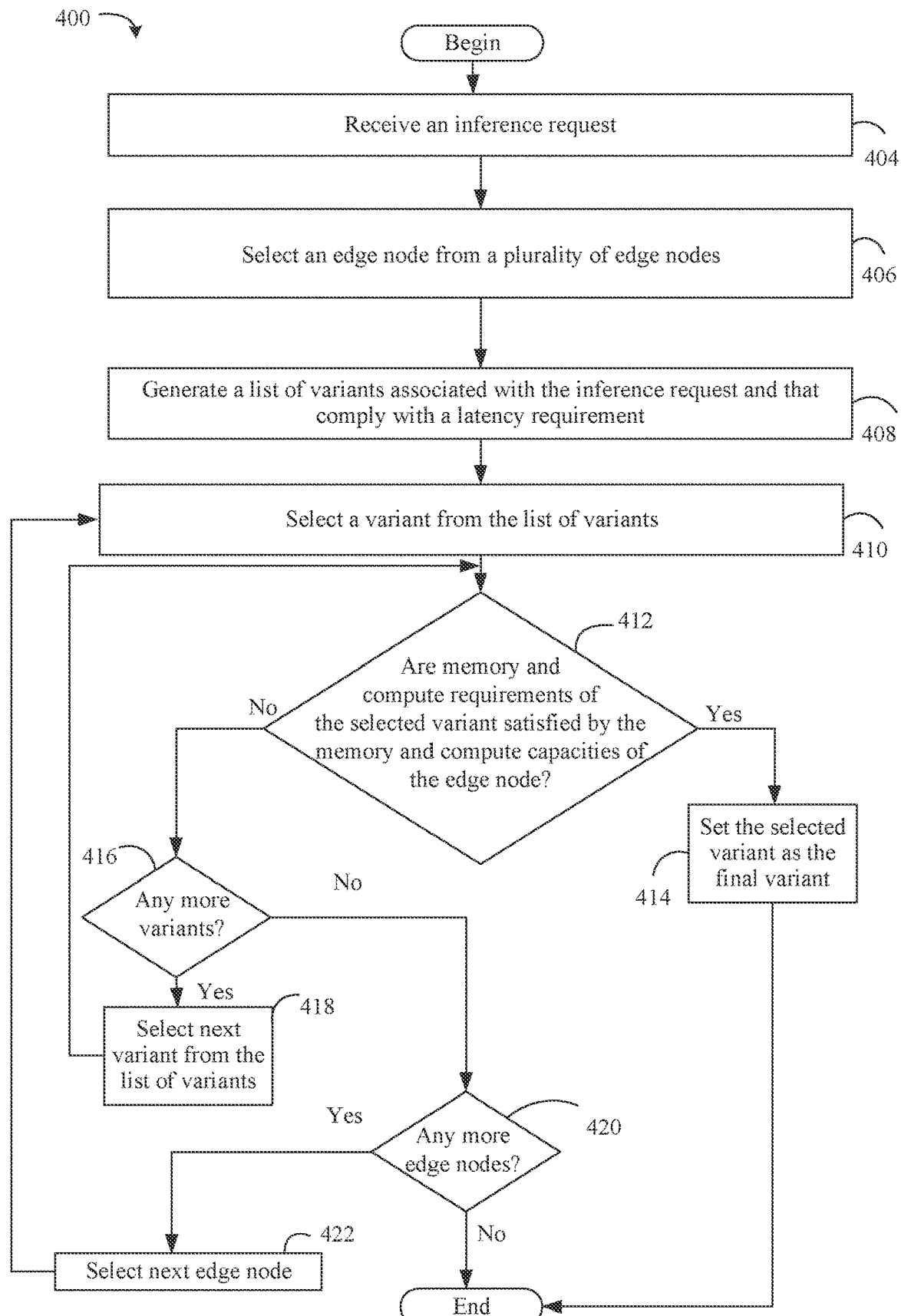
FIG. 5 is a flowchart of an example of a method of allocating an inference request according to an embodiment.

FIG. 5 shows an allocation method 400 to allocate an inference request. The method 400 may generally be implemented with the embodiments described herein, for example, the system 100 (FIG. 1), the process 300 (FIG. 2), method 800 (FIG. 3) and/or method 350 (FIG. 4) already discussed. The method 400 may be readily substituted for processing block 358 (FIG. 4). The method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 404 receives an inference request. Illustrated processing block 406 selects an edge node from a plurality of edge nodes. Illustrated processing block 408 generates a list of variants associated with the inference request and that comply with a latency requirement. Illustrated processing block 410 selects a variant from the list of variants. Illustrated processing block 412 determines if memory and compute requirements of the selected variant are satisfied by the memory and compute capacities of the edge node. If so, illustrated processing block 414 sets the selected variant as the final variant, and assigns the selected variant to the selected edge node. Otherwise, illustrated processing block 416 determines if there are any more variants. If so, illustrated processing block 418 selects the next variant from the list of variants. If there are no more variants, illustrated processing block 420 determines if there are any more edge nodes. If not, the method ends with the model being unallocated. Otherwise, illustrated processing block 422 selects the next edge node to determine if a variant is to be allocated to the edge node.

Figure 6:
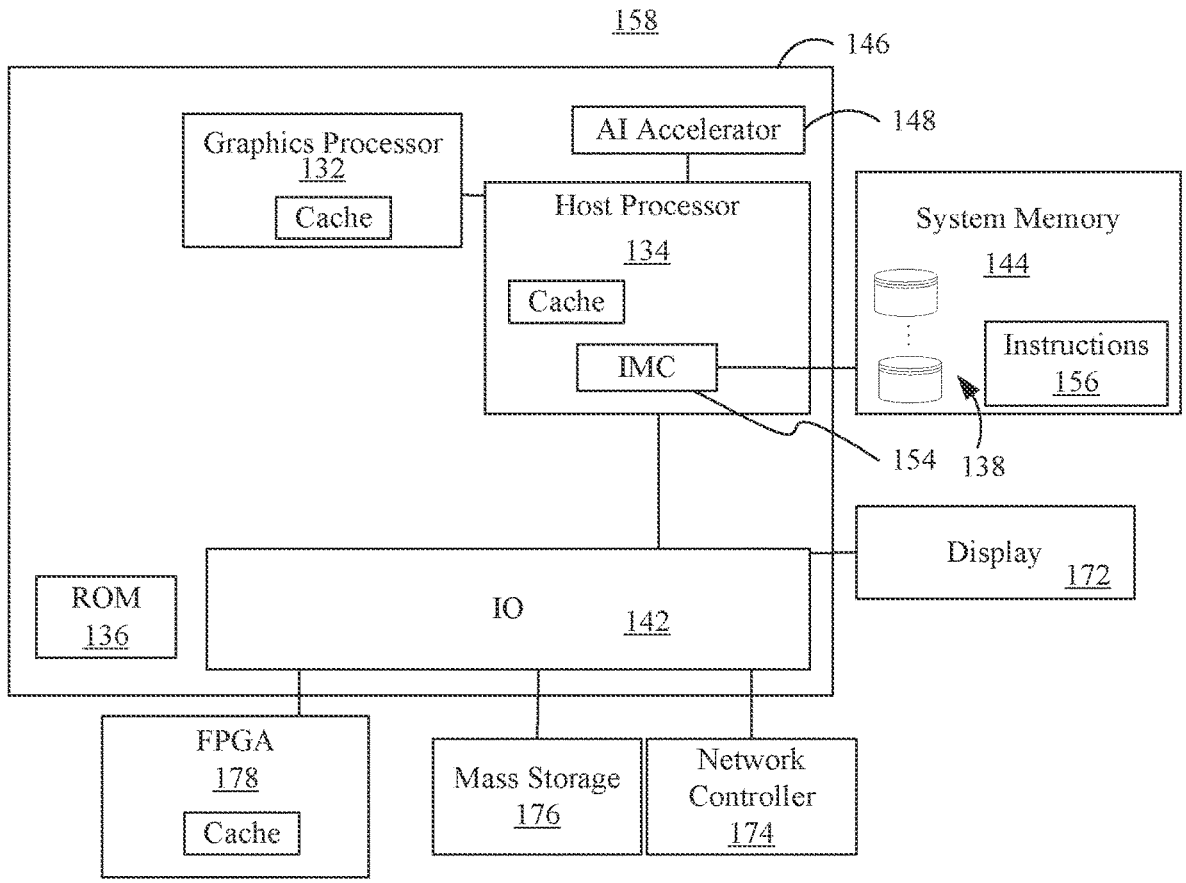
FIG. 6 is a block diagram of an example of an inference request allocation computing system according to an embodiment.

Turning now to FIG. 6, a performance enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the computing system 158 includes a host processor 134 (e.g., CPU) having an integrated memory controller (IMC) 154 that is coupled to a system memory 144.

The illustrated computing system 158 also includes an input output (IO) module 142 implemented together with the host processor 134, a graphics processor 132 (e.g., GPU), ROM 136, and AI accelerator 148 on a semiconductor die 146 as a system on chip (SoC). The illustrated IO module 142 communicates with, for example, a display 172 (e.g., touch screen, liquid crystal display/LCD, light emitting diode/LED display), a network controller 174 (e.g., wired and/or wireless), FPGA 178 and mass storage 176 (e.g., hard disk drive/HDD, optical disk, solid state drive/SSD, flash memory). Furthermore, the SoC 146 may further include processors (not shown) and/or the AI accelerator 148 dedicated to artificial intelligence (AI) and/or neural network (NN) processing. For example, the system SoC 146 may include vision processing units (VPUs,) and/or other AI/NN-specific processors such as AI accelerator 148, etc. In some embodiments, any aspect of the embodiments described herein may be implemented in the processors and/or accelerators dedicated to AI and/or NN processing such as AI accelerator 148, the graphics processor 132 and/or the host processor 134.

The graphics processor 132 and/or the host processor 134 may execute instructions 156 retrieved from the system memory 144 (e.g., a dynamic random-access memory) and/or the mass storage 176 to implement aspects as described herein. For example, the graphics processor 132 and/or the host processor 134 may identify an AI model (e.g., a high-level code) for execution. The computing system 158 may analyze characteristics of variants 138 of the AI model and characteristics of edge nodes to allocate a variant to one of the edge nodes. The computing system 158 may communicate the variant and an instruction to execute the variant to the one edge node through the network controller 174.

When the instructions 156 are executed, the computing system 158 may implement one or more aspects of the embodiments described herein. For example, the computing system 158 may implement one or more aspects of the system 100 (FIG. 1), the process 300 (FIG. 2), method 800 (FIG. 3), method 350 (FIG. 4) and/or method 400 (FIG. 5) already discussed. The illustrated computing system 158 is therefore considered to be performance-enhanced at least to the extent that it enables the computing system 158 to autonomously allocate inference requests in an efficient manner.

Figure 7:
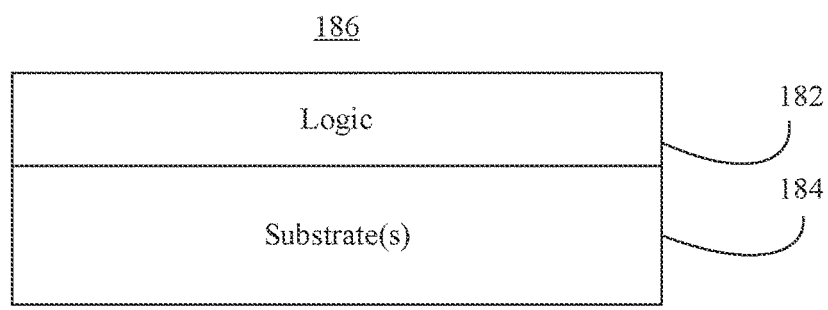
FIG. 7 is an illustration of an example of a semiconductor apparatus according to an embodiment.

FIG. 7 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein, for example, the system 100 (FIG. 1), the process 300 (FIG. 2), method 800 (FIG. 3), method 350 (FIG. 4) and/or method 400 (FIG. 5) already discussed. The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 8:
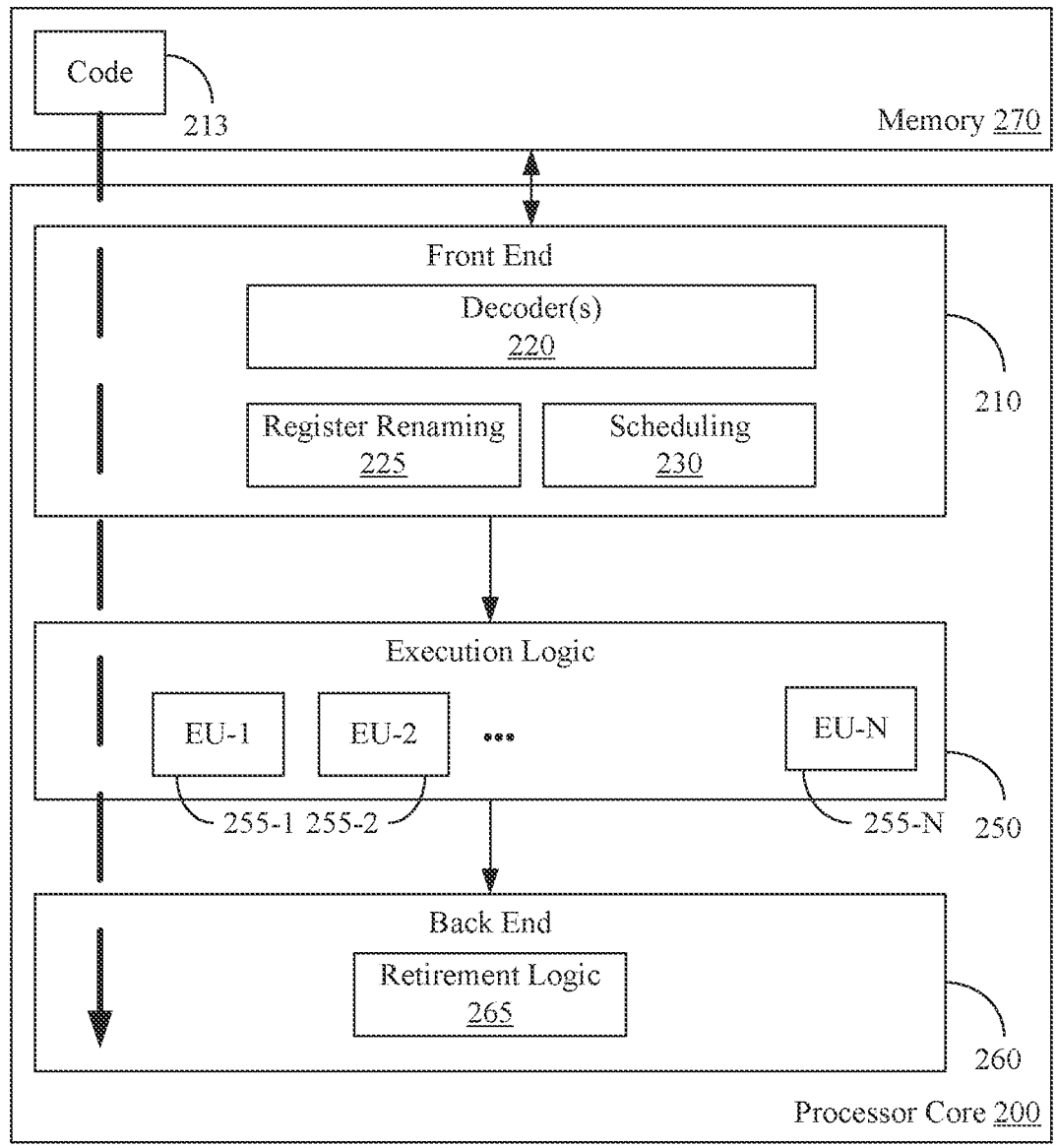
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the system 100 (FIG. 1), the process 300 (FIG. 2), method 800 (FIG. 3), method 350 (FIG. 4) and/or method 400 (FIG. 5) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the system 100 (FIG. 1), the process 300 (FIG. 2), method 800 (FIG. 3), method 350 (FIG. 4) and/or method 400 (FIG. 5) already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 includes a computing system comprising a network controller to communicate with edge nodes, a processor coupled to the network controller, and a memory coupled to the processor, the memory including a set of executable program instructions, which when executed by the processor, cause the computing system to identify compute capacities of the edge nodes and memory capacities of the edge nodes, identify a first variant of an Artificial Intelligence (AI) model, and assign the first variant to a first edge node of the edge nodes based on a compute capacity requirement associated with execution of the first variant, a memory resource requirement associated with the execution of the first variant, the compute capacities of the edge nodes and the memory capacities of the edge nodes.

Example 2 includes the computing system of Example 1, wherein the executable program instructions, when executed, cause the computing system to identify a plurality of variants of the AI model, determine whether the plurality of variants satisfy a latency condition associated with the AI model, and bypass a second variant of the plurality of variants for execution based on an identification that the second variant does not satisfy the latency condition.

Example 3 includes the computing system of Example 2, wherein the executable program instructions, when executed, cause the computing system to identify that a third variant of the plurality of variants satisfies the latency condition, and bypass the third variant for execution based on an identification that one or more of a memory resource requirement associated with the third variant is unsatisfied by the memory capacities or a compute capacity requirement associated with the third variant is unsatisfied by the compute capacities.

Example 4 includes the computing system of Example 1, wherein the executable program instructions, when executed, cause the computing system to determine that a first compute capacity of the compute capacities satisfies the compute capacity requirement, wherein the first compute capacity is associated with the first edge node, and determine that a first memory capacity of the memory capacities satisfies the memory resource requirement, wherein the first memory capacity is associated with the first edge node.

Example 5 includes the computing system of Example 4, wherein the executable program instructions, when executed, cause the computing system to determine that one or more of the compute capacity requirement is not satisfied by a second compute capacity of the compute capacities or the memory resource requirement is not satisfied by a second memory capacity of the memory capacities, wherein the second memory capacity and the second compute capacity are associated with a second edge node of the edge nodes, and bypass the second edge node for the execution of the first variant.

Example 6 includes the computing system of any one of Examples 1 to 5, wherein the executable program instructions, when executed, cause the computing system to bypass analysis of whether a fourth variant of the AI model is to be executed in response to the first variant being assigned to the first edge node.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to identify compute capacities of edge nodes and memory capacities of the edge nodes, identify a first variant of an Artificial Intelligence (AI) model, and assign the first variant to a first edge node of the edge nodes based on a compute capacity requirement associated with execution of the first variant, a memory resource requirement associated with the execution of the first variant, the compute capacities of the edge nodes and the memory capacities of the edge nodes.

Example 8 includes the apparatus of Example 7, wherein the logic coupled to the one or more substrates is to identify a plurality of variants of the AI model, determine whether the plurality of variants satisfy a latency condition associated with the AI model, and bypass a second variant of the plurality of variants for execution based on an identification that the second variant does not satisfy the latency condition.

Example 9 includes the apparatus of Example 8, wherein the logic coupled to the one or more substrates is to identify that a third variant of the plurality of variants satisfies the latency condition, and bypass the third variant for execution based on an identification that one or more of a memory resource requirement associated with the third variant is unsatisfied by the memory capacities or a compute capacity requirement associated with the third variant is unsatisfied by the compute capacities.

Example 10 includes the apparatus of Example 7, wherein the logic coupled to the one or more substrates is to determine that a first compute capacity of the compute capacities satisfies the compute capacity requirement, wherein the first compute capacity is associated with the first edge node, and determine that a first memory capacity of the memory capacities satisfies the memory resource requirement, wherein the first memory capacity is associated with the first edge node.

Example 11 includes the apparatus of Example 10, wherein the logic coupled to the one or more substrates is to determine that one or more of the compute capacity requirement is not satisfied by a second compute capacity of the compute capacities or the memory resource requirement is not satisfied by a second memory capacity of the memory capacities, wherein the second memory capacity and the second compute capacity are associated with a second edge node of the edge nodes, and bypass the second edge node for the execution of the first variant.

Example 12 includes the apparatus of any one of Examples 7 to 11, wherein the logic coupled to the one or more substrates is to bypass analysis of whether a fourth variant of the AI model is to be executed in response to the first variant being assigned to the first edge node.

Example 13 includes the apparatus of any one of Examples 7 to 11, wherein the logic coupled to the one or more substrates includes transistor channel regions that are positioned within the one or more substrates.

Example 14 includes a least one computer readable storage medium comprising a set of executable program instructions, which when executed by a computing system, cause the computing system to identify compute capacities of edge nodes and memory capacities of the edge nodes, identify a first variant of an Artificial Intelligence (AI) model, and assign the first variant to a first edge node of the edge nodes based on a compute capacity requirement associated with execution of the first variant, a memory resource requirement associated with the execution of the first variant, the compute capacities of the edge nodes and the memory capacities of the edge nodes.

Example 15 includes the at least one computer readable storage medium of Example 14, wherein the instructions, when executed, further cause the computing system to identify a plurality of variants of the AI model, determine whether the plurality of variants satisfy a latency condition associated with the AI model, and bypass a second variant of the plurality of variants for execution based on an identification that the second variant does not satisfy the latency condition.

Example 16 includes the at least one computer readable storage medium of Example 15, wherein the instructions, when executed, further cause the computing system to identify that a third variant of the plurality of variants satisfies the latency condition, and bypass the third variant for execution based on an identification that one or more of a memory resource requirement associated with the third variant is unsatisfied by the memory capacities or a compute capacity requirement associated with the third variant is unsatisfied by the compute capacities.

Example 17 includes the at least one computer readable storage medium of Example 14, wherein the instructions, when executed, further cause the computing system to determine that a first compute capacity of the compute capacities satisfies the compute capacity requirement, wherein the first compute capacity is associated with the first edge node, and determine that a first memory capacity of the memory capacities satisfies the memory resource requirement, wherein the first memory capacity is associated with the first edge node.

Example 18 includes the at least one computer readable storage medium of Example 17, wherein the instructions, when executed, further cause the computing system to determine that one or more of the compute capacity requirement is not satisfied by a second compute capacity of the compute capacities or the memory resource requirement is not satisfied by a second memory capacity of the memory capacities, wherein the second memory capacity and the second compute capacity are associated with a second edge node of the edge nodes, and bypass the second edge node for the execution of the first variant.

Example 19 includes the at least one computer readable storage medium of any one of Examples 14 to 18, wherein the instructions, when executed, further cause the computing system to bypass analysis of whether a fourth variant of the AI model is to be executed in response to the first variant being assigned to the first edge node.

Example 20 includes a method comprising identifying compute capacities of edge nodes and memory capacities of the edge nodes, identifying a first variant of an Artificial Intelligence (AI) model, and assigning the first variant to a first edge node of the edge nodes based on a compute capacity requirement associated with execution of the first variant, a memory resource requirement associated with the execution of the first variant, the compute capacities of the edge nodes and the memory capacities of the edge nodes.

Example 21 includes the method of Example 20, further comprising identifying a plurality of variants of the AI model, determining whether the plurality of variants satisfy a latency condition associated with the AI model, and bypassing a second variant of the plurality of variants for execution based on an identification that the second variant does not satisfy the latency condition.

Example 22 includes the method of Example 21, further comprising identifying that a third variant of the plurality of variants satisfies the latency condition, and bypassing the third variant for execution based on an identification that one or more of a memory resource requirement associated with the third variant is unsatisfied by the memory capacities or a compute capacity requirement associated with the third variant is unsatisfied by the compute capacities.

Example 23 includes the method of Example 20, further comprising determining that a first compute capacity of the compute capacities satisfies the compute capacity requirement, wherein the first compute capacity is associated with the first edge node, and determining that a first memory capacity of the memory capacities satisfies the memory resource requirement, wherein the first memory capacity is associated with the first edge node.

Example 24 includes the method of Example 23, further comprising determining that one or more of the compute capacity requirement is not satisfied by a second compute capacity of the compute capacities or the memory resource requirement is not satisfied by a second memory capacity of the memory capacities, wherein the second memory capacity and the second compute capacity are associated with a second edge node of the edge nodes, and bypassing the second edge node for the execution of the first variant.

Example 25 includes the method of any one of Examples 20 to 24, further comprising bypassing analysis of whether a second variant of the AI model is to be executed in response to the first variant being assigned to the first edge node.

Example 26 includes a semiconductor apparatus comprising means for identifying compute capacities of edge nodes and memory capacities of the edge nodes, means for identifying a first variant of an Artificial Intelligence (AI) model, and means for assigning the first variant to a first edge node of the edge nodes based on a compute capacity requirement associated with execution of the first variant, a memory resource requirement associated with the execution of the first variant, the compute capacities of the edge nodes and the memory capacities of the edge nodes.

Example 27 includes the semiconductor apparatus of Example 26, further comprising means for identifying a plurality of variants of the AI model, means for determining whether the plurality of variants satisfy a latency condition associated with the AI model, and means for bypassing a second variant of the plurality of variants for execution based on an identification that the second variant does not satisfy the latency condition.

Example 28 includes the semiconductor apparatus of Example 27, further comprising means for identifying that a third variant of the plurality of variants satisfies the latency condition, and means for bypassing the third variant for execution based on an identification that one or more of a memory resource requirement associated with the third variant is unsatisfied by the memory capacities or a compute capacity requirement associated with the third variant is unsatisfied by the compute capacities.

Example 29 includes the semiconductor apparatus of Example 26, further comprising means for determining that a first compute capacity of the compute capacities satisfies the compute capacity requirement, wherein the first compute capacity is to be associated with the first edge node, and determining that a first memory capacity of the memory capacities satisfies the memory resource requirement, wherein the first memory capacity is to be associated with the first edge node.

Example 30 includes the semiconductor apparatus of Example 29, further comprising means for determining that one or more of the compute capacity requirement is not satisfied by a second compute capacity of the compute capacities or the memory resource requirement is not satisfied by a second memory capacity of the memory capacities, wherein the second memory capacity and the second compute capacity are to be associated with a second edge node of the edge nodes, and means for bypassing the second edge node for the execution of the first variant.

Example 31 includes the semiconductor apparatus of any one of Examples 26 to 30, further comprising means for bypassing analysis of whether a fourth variant of the AI model is to be executed in response to the first variant being assigned to the first edge node.

Thus, technology described herein may provide for an enhanced distribution of inference workloads across heterogenous devices. In particular, embodiments as described herein are distributed based on memory and compute requirements of the inference requests and memory and compute capacities of edge nodes to efficiently pair inference requests with the edge nodes and to meet latency requirements.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller to communicate with edge nodes;
a processor coupled to the network controller; and
a memory coupled to the processor, the memory including a set of executable program instructions, which when executed by the processor, cause the computing system to:
identify compute capacities of the edge nodes and memory capacities of the edge nodes;
identify a first variant of an Artificial Intelligence (AI) model; and
assign the first variant to a first edge node of the edge nodes based on a compute capacity requirement associated with execution of the first variant, a memory resource requirement associated with the execution of the first variant, the compute capacities of the edge nodes and the memory capacities of the edge nodes.

2. The computing system of claim 1, wherein the executable program instructions, when executed, cause the computing system to:
identify a plurality of variants of the AI model;
determine whether the plurality of variants satisfy a latency condition associated with the AI model; and
bypass a second variant of the plurality of variants for execution based on an identification that the second variant does not satisfy the latency condition.

3. The computing system of claim 2, wherein the executable program instructions, when executed, cause the computing system to:
identify that a third variant of the plurality of variants satisfies the latency condition; and
bypass the third variant for execution based on an identification that one or more of a memory resource requirement associated with the third variant is unsatisfied by the memory capacities or a compute capacity requirement associated with the third variant is unsatisfied by the compute capacities.

4. The computing system of claim 1, wherein the executable program instructions, when executed, cause the computing system to:
determine that a first compute capacity of the compute capacities satisfies the compute capacity requirement, wherein the first compute capacity is associated with the first edge node; and
determine that a first memory capacity of the memory capacities satisfies the memory resource requirement, wherein the first memory capacity is associated with the first edge node.

5. The computing system of claim 4, wherein the executable program instructions, when executed, cause the computing system to:
determine that one or more of the compute capacity requirement is not satisfied by a second compute capacity of the compute capacities or the memory resource requirement is not satisfied by a second memory capacity of the memory capacities, wherein the second memory capacity and the second compute capacity are associated with a second edge node of the edge nodes; and
bypass the second edge node for the execution of the first variant.

6. The computing system of claim 1, wherein the executable program instructions, when executed, cause the computing system to:
bypass analysis of whether a fourth variant of the AI model is to be executed in response to the first variant being assigned to the first edge node.

7. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
identify compute capacities of edge nodes and memory capacities of the edge nodes;
identify a first variant of an Artificial Intelligence (AI) model; and
assign the first variant to a first edge node of the edge nodes based on a compute capacity requirement associated with execution of the first variant, a memory resource requirement associated with the execution of the first variant, the compute capacities of the edge nodes and the memory capacities of the edge nodes.

8. The apparatus of claim 7, wherein the logic coupled to the one or more substrates is to:
identify a plurality of variants of the AI model;
determine whether the plurality of variants satisfy a latency condition associated with the AI model; and bypass a second variant of the plurality of variants for execution based on an identification that the second variant does not satisfy the latency condition.

9. The apparatus of claim 8, wherein the logic coupled to the one or more substrates is to:
identify that a third variant of the plurality of variants satisfies the latency condition; and
bypass the third variant for execution based on an identification that one or more of a memory resource requirement associated with the third variant is unsatisfied by the memory capacities or a compute capacity requirement associated with the third variant is unsatisfied by the compute capacities.

10. The apparatus of claim 7, wherein the logic coupled to the one or more substrates is to:
determine that a first compute capacity of the compute capacities satisfies the compute capacity requirement, wherein the first compute capacity is associated with the first edge node; and
determine that a first memory capacity of the memory capacities satisfies the memory resource requirement, wherein the first memory capacity is associated with the first edge node.

11. The apparatus of claim 10, wherein the logic coupled to the one or more substrates is to:
determine that one or more of the compute capacity requirement is not satisfied by a second compute capacity of the compute capacities or the memory resource requirement is not satisfied by a second memory capacity of the memory capacities, wherein the second memory capacity and the second compute capacity are associated with a second edge node of the edge nodes; and
bypass the second edge node for the execution of the first variant.

12. The apparatus of claim 7, wherein the logic coupled to the one or more substrates is to:
bypass analysis of whether a fourth variant of the AI model is to be executed in response to the first variant being assigned to the first edge node.

13. The apparatus of claim 7, wherein the logic coupled to the one or more substrates includes transistor channel regions that are positioned within the one or more substrates.

14. At least one non-transitory computer readable storage medium comprising a set of executable program instructions, which when executed by a computing system, cause the computing system to:
identify compute capacities of edge nodes and memory capacities of the edge nodes;
identify a first variant of an Artificial Intelligence (AI) model; and
assign the first variant to a first edge node of the edge nodes based on a compute capacity requirement associated with execution of the first variant, a memory resource requirement associated with the execution of the first variant, the compute capacities of the edge nodes and the memory capacities of the edge nodes.

15. The at least one non-transitory computer readable storage medium of claim 14, wherein the instructions, when executed, further cause the computing system to:
identify a plurality of variants of the AI model;
determine whether the plurality of variants satisfy a latency condition associated with the AI model; and
bypass a second variant of the plurality of variants for execution based on an identification that the second variant does not satisfy the latency condition.

16. The at least one non-transitory computer readable storage medium of claim 15, wherein the instructions, when executed, further cause the computing system to:
identify that a third variant of the plurality of variants satisfies the latency condition; and
bypass the third variant for execution based on an identification that one or more of a memory resource requirement associated with the third variant is unsatisfied by the memory capacities or a compute capacity requirement associated with the third variant is unsatisfied by the compute capacities.

17. The at least one non-transitory computer readable storage medium of claim 14, wherein the instructions, when executed, further cause the computing system to:
determine that a first compute capacity of the compute capacities satisfies the compute capacity requirement, wherein the first compute capacity is associated with the first edge node; and
determine that a first memory capacity of the memory capacities satisfies the memory resource requirement, wherein the first memory capacity is associated with the first edge node.

18. The at least one non-transitory computer readable storage medium of claim 17, wherein the instructions, when executed, further cause the computing system to:
determine that one or more of the compute capacity requirement is not satisfied by a second compute capacity of the compute capacities or the memory resource requirement is not satisfied by a second memory capacity of the memory capacities, wherein the second memory capacity and the second compute capacity are associated with a second edge node of the edge nodes; and
bypass the second edge node for the execution of the first variant.

19. The at least one non-transitory computer readable storage medium of claim 14, wherein the instructions, when executed, further cause the computing system to:
bypass analysis of whether a fourth variant of the AI model is to be executed in response to the first variant being assigned to the first edge node.

20. A method comprising:
identifying compute capacities of edge nodes and memory capacities of the edge nodes;
identifying a first variant of an Artificial Intelligence (AI) model; and
assigning the first variant to a first edge node of the edge nodes based on a compute capacity requirement associated with execution of the first variant, a memory resource requirement associated with the execution of the first variant, the compute capacities of the edge nodes and the memory capacities of the edge nodes.

21. The method of claim 20, further comprising:
identifying a plurality of variants of the AI model;
determining whether the plurality of variants satisfy a latency condition associated with the AI model; and
bypassing a second variant of the plurality of variants for execution based on an identification that the second variant does not satisfy the latency condition.

22. The method of claim 21, further comprising:
identifying that a third variant of the plurality of variants satisfies the latency condition; and
bypassing the third variant for execution based on an identification that one or more of a memory resource requirement associated with the third variant is unsatisfied by the memory capacities or a compute capacity requirement associated with the third variant is unsatisfied by the compute capacities.

23. The method of claim 20, further comprising:
determining that a first compute capacity of the compute capacities satisfies the compute capacity requirement, wherein the first compute capacity is associated with the first edge node; and determining that a first memory capacity of the memory capacities satisfies the memory resource requirement, wherein the first memory capacity is associated with the first edge node.

24. The method of claim 23, further comprising:
determining that one or more of the compute capacity requirement is not satisfied by a second compute capacity of the compute capacities or the memory resource requirement is not satisfied by a second memory capacity of the memory capacities, wherein the second memory capacity and the second compute capacity are associated with a second edge node of the edge nodes; and bypassing the second edge node for the execution of the first variant.

25. The method of claim 20, further comprising:
bypassing analysis of whether a fourth variant of the AI model is to be executed in response to the first variant being assigned to the first edge node.

\* \* \* \* \*